US012199363B2

(12) United States Patent
Hara et al.

(10) Patent No.: US 12,199,363 B2
(45) Date of Patent: Jan. 14, 2025

(54) ANTENNA MODULE

(71) Applicant: TDK Corporation, Tokyo (JP)

(72) Inventors: Yasuyuki Hara, Tokyo (JP); Yuta Ashida, Tokyo (JP)

(73) Assignee: TDK Corporation, Tokyo (JP)

( * ) Notice: Subject to any disclaimer, the term of this patent is extended or adjusted under 35 U.S.C. 154(b) by 149 days.

(21) Appl. No.: 17/900,155

(22) Filed: Aug. 31, 2022

(65) Prior Publication Data

US 2023/0060223 A1 Mar. 2, 2023

(30) Foreign Application Priority Data

Sep. 1, 2021 (JP) ................................ 2021-142392

(51) Int. Cl.
*H01Q 9/04* (2006.01)

(52) U.S. Cl.
CPC .......... *H01Q 9/045* (2013.01); *H01Q 9/0414* (2013.01)

(58) Field of Classification Search
CPC ...... H01P 1/203; H01Q 21/065; H01Q 21/24; H01Q 9/0414; H01Q 9/045; H01Q 9/0457
See application file for complete search history.

(56) References Cited

U.S. PATENT DOCUMENTS 4,462,009 A * 7/1984 Landt ........................ H03J 7/02 455/340
5,949,310 A * 9/1999 Matsumoto ......... H01P 1/20336 333/202
2008/0048797 A1* 2/2008 Matters-Kammerer ..................... H01P 7/084 333/204
2008/0204350 A1* 8/2008 Tam ..................... H01Q 21/065 343/872
2010/0007574 A1* 1/2010 Thornell-Pers .......... H01Q 9/46 343/876
2011/0050364 A1* 3/2011 Achour ................ H05K 1/0236 333/185
2011/0103274 A1* 5/2011 Vavik ....................... H04B 3/54 370/293
2013/0250536 A1* 9/2013 Satake ................ H01P 1/20345 361/783
2020/0106148 A1 4/2020 Ashida et al.
(Continued)

FOREIGN PATENT DOCUMENTS

JP 2020-057920 A 4/2020
JP 2020-088493 A 6/2020
WO 2019/054063 A1 9/2020

*Primary Examiner* — Thien M Le
(74) *Attorney, Agent, or Firm* — Rimon P.C.

(57) ABSTRACT

An antenna module includes first and second signal pads, an antenna element, and first and second filters. The first signal pad is coupled to the antenna element through the first to fourth conductor patterns of the first filter. The second signal pad is coupled to the antenna element through the fifth to eighth conductor patterns of the first filter. The second, third, sixth and seventh conductor patterns extend along the diagonal line of the antenna element. The second and sixth conductor patterns face each other with the diagonal line interposed therebetween. The third and seventh conductor patterns face each other with the diagonal line interposed therebetween. The first, fourth, fifth and eighth conductor patterns extend in the second direction, respectively with respect to the second, third, sixth and seventh conductor patterns.

8 Claims, 5 Drawing Sheets

(56) References Cited

U.S. PATENT DOCUMENTS

| | | | | |
|---|---|---|---|---|
| 2020/0161767 | A1 | 5/2020 | Hara et al. | |
| 2020/0203831 | A1* | 6/2020 | Ichikawa | H02J 50/12 |
| 2020/0220270 | A1 | 7/2020 | Onaka et al. | |
| 2023/0198148 | A1* | 6/2023 | Wong | H01Q 1/36<br>343/702 |
| 2023/0335885 | A1* | 10/2023 | Yukimasa | H01Q 1/24 |
| 2024/0063831 | A1* | 2/2024 | Arkiszewski | H04B 1/006 |

* cited by examiner

ANTENNA MODULE

This application claims the benefit of Japanese Patent Application No. 2021-142392, filed on Sep. 1, 2021, the entire disclosure of which is incorporated by reference herein.

BACKGROUND

The present disclosure relates to an antenna module.

International Publication WO 2019/054063 discloses a dual polarization antenna module.

In the antenna module described in WO 2019/054063, it is not easy to layout a filter circuit having a relatively large size, such as a ½-wavelength filter.

SUMMARY

An antenna module according to one embodiment of the present disclosure includes first and second signal pads, an antenna element, a first filter inserted between the first signal pad and the antenna element, and a second filter inserted between the second signal pad and the antenna element. The first filter includes first to fourth conductor patterns. The second filter includes fifth to eighth conductor patterns. The first signal pad is coupled to the antenna element through the first to fourth conductor patterns in this order. The second signal pad is coupled to the antenna element through the fifth to eighth conductor patterns in this order. The second and third conductor patterns are arranged in a line so as to extend in a first direction along the diagonal line of the antenna element. The sixth and seventh conductor patterns are arranged in a line so as to extend in the first direction along the diagonal line of the antenna element. The second and sixth conductor patterns face each other in a second direction perpendicular to the first direction with the diagonal line interposed therebetween. The third and seventh conductor patterns face each other in the second direction with the diagonal line interposed therebetween. The first and fourth conductor patterns extend in the second direction, respectively with respect to the second and third conductor patterns. The fifth and eighth conductor patterns extend in the second direction, respectively with respect to the sixth and seventh conductor patterns.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

An object of the present disclosure is to provide an improved dual polarization antenna module.

Preferred embodiments of the present disclosure will be explained below in detail with reference to the accompanying drawings.

Figure 1:
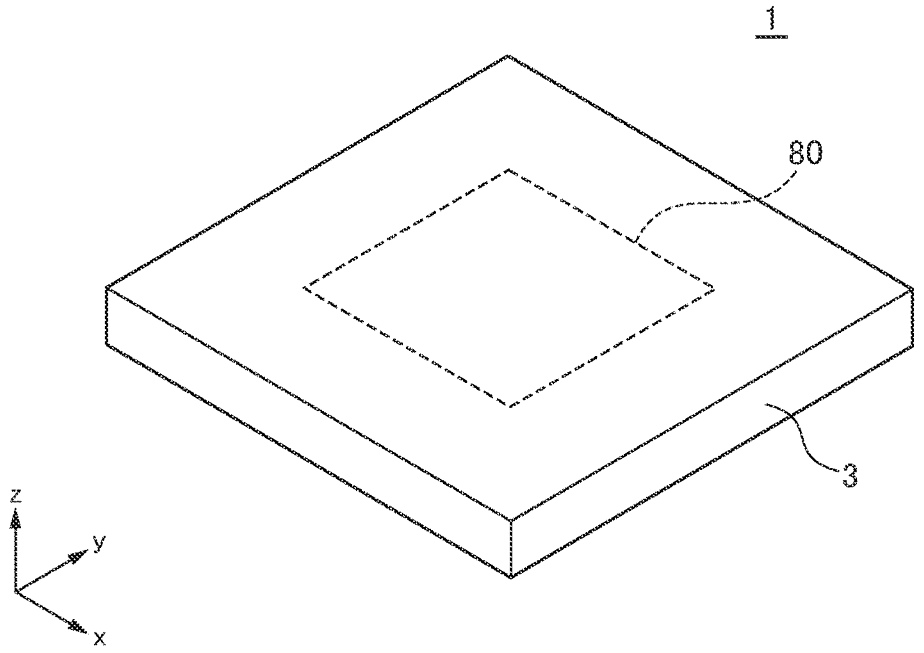
FIG. 1 is a schematic perspective view illustrating the outer appearance of an antenna module 1 according to a first embodiment of the present disclosure.

FIG. 1 is a schematic perspective view illustrating the outer appearance of an antenna module 1 according to a first embodiment of the present disclosure.

As illustrated in FIG. 1, the antenna module 1 according to the first embodiment includes a flat plate-shaped element body 3 in which the xy-direction and the z-direction are defined as the planar direction and the thickness direction, respectively, and a plurality of conductor patterns, including an antenna element 80, embedded in the element body 3. The element body 3 has a multilayer structure and can be made of a ceramic material such as LTCC (Low Temperature Co-Fired Ceramics) or a resin material.

FIGS. 2 to 9 are schematic plan views each illustrating the pattern shape of a conductor pattern included in the antenna module 1.

Figure 2:
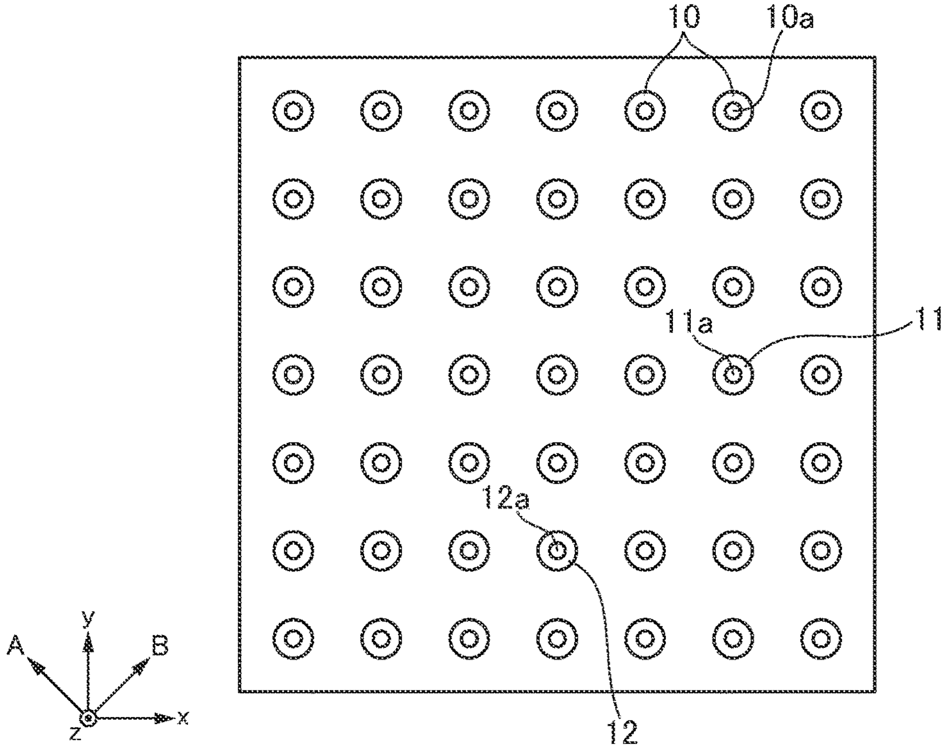
FIGS. 2 to 9 are schematic plan views each illustrating the pattern shape of a conductor pattern included in the antenna module 1.

The conductor pattern illustrated in FIG. 2 is a conductor pattern of a lowermost conductor layer. The lowermost conductor layer has a plurality of ground pads 10, a first signal pad 11, and a second signal pad 12. The first signal pad 11 is a terminal for transmitting/receiving, for example, a vertically polarized signal, and the second signal pad 12 is a terminal for transmitting/receiving, for example, a horizontally polarized signal. The plurality of ground pads 10, first signal pad 11, and second signal pad 12 may each have a solder ball mounted thereon. In the example of FIG. 2, 7×7 pads are arranged in an array in the x- and y-directions, and one of them is the first signal pad 11, another one of them is the second signal pad 12, and the remaining 47 pads are ground pads 10. Some ground pads 10 may be omitted. Although not particularly limited, the positions of the first and second signal pads 11 and 12 may not be positioned at the outer periphery and may be symmetrically positioned with respect to the diagonal line extending in the direction A. Each of the ground pads 10, first signal pad 11, and second signal pad 12 are connected respectively with through hole conductors 10*a*, 11*a*, and 12*a* extending in the z-direction.

Figure 3:
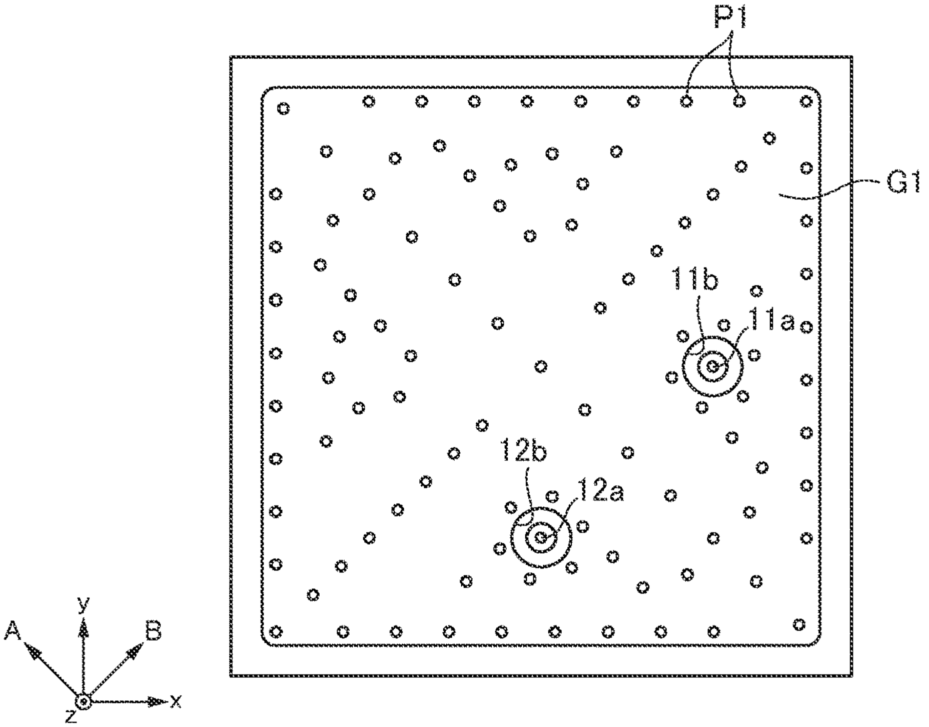

The conductor pattern illustrated in FIG. 3 is a conductor pattern positioned in the upper layer of the conductor pattern illustrated in FIG. 2 and has a ground pattern G1 formed on substantially the entire surface of the xy plane. The ground pattern G1 is connected to the plurality of ground pads 10 through the through hole conductors 10*a* illustrated in FIG. 2. As illustrated in FIG. 3, the ground pattern G1 has openings 11*b* and 12*b*, and the through hole conductors 11*a* and 12*a* pass through the openings 11*b* and 12*b*, respectively, to be connected to a conductor pattern in the upper layer. The ground pattern G1 is further connected to a ground pattern in the upper layer through a plurality of through hole conductors P1.

Figure 4:
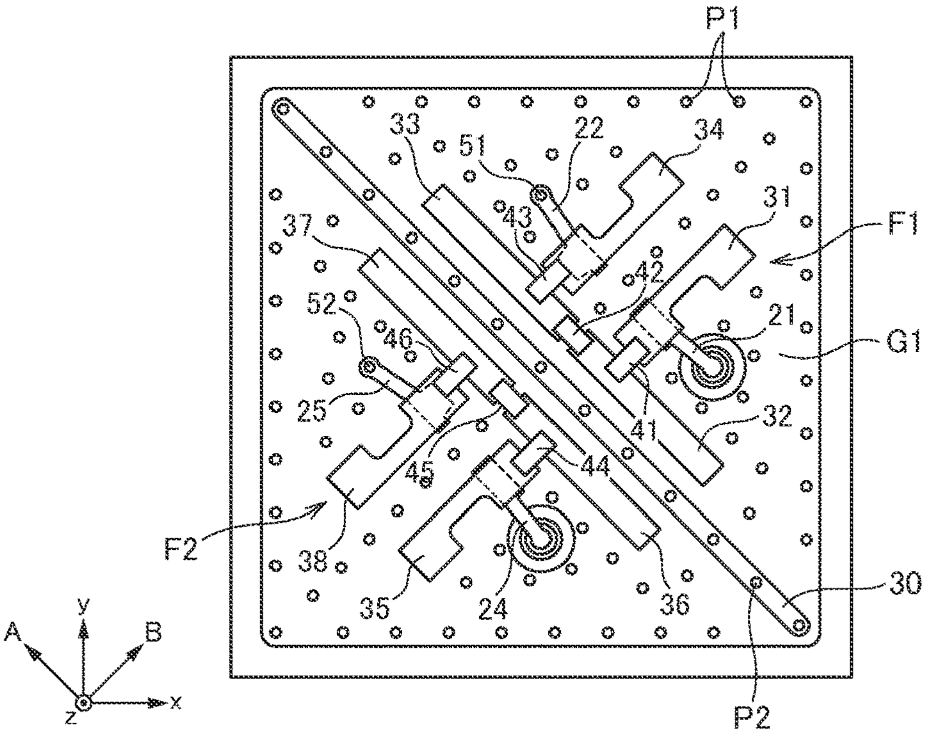

The conductor pattern illustrated in FIG. 4 is a conductor pattern positioned in the upper layer of the conductor pattern illustrated in FIG. 3 and has a ground pattern 30 disposed on the diagonal line extending in the direction A, a first ½ wavelength filer F1, and a second ½ wavelength filer F2. The ground pattern 30 is connected to the ground pattern G1 through the through hole conductors P1 illustrated in FIG. 3. The ground pattern 30 is further connected to a ground pattern in the upper layer through a plurality of through hole conductors P2. The first and second ½ wavelength filers F1 and F2 are each a band-pass filter having a so-called π type structure.

The first ½ wavelength filer F1 includes first to fourth resonance patterns 31 to 34. The first to fourth resonance patterns 31 to 34 are examples of first to fourth conductor patterns, respectively. As illustrated in FIG. 4, the second and third resonance patterns 32 and 33 are arranged in a line so as to extend in the direction A that is a first direction along the ground pattern 30, i.e., the diagonal line. Further, the first and fourth resonance patterns 31 and 34 extend in the direction B that is a second direction, respectively with respect to the second and third resonance patterns 32 and 33. The direction B is the extending direction of another diagonal line and is perpendicular to the direction A.

The first resonance pattern 31 overlaps a part of a first wiring 21. The first wiring 21 is connected to the first signal pad 11 through the through hole conductor 11*a*. Accordingly, the first resonance pattern 31 is connected to the first signal pad 11 through capacitive coupling to the first wiring 21. The first and second resonance patterns 31 and 32 are capacitively coupled to each other through a coupling pattern 41. The second and third resonance patterns 32 and 33 are capacitively coupled to each other through a coupling pattern 42. The third and fourth resonance patterns 33 and 34 are capacitively coupled to each other through a coupling pattern 43. The fourth resonance pattern 34 overlaps a part of a second wiring 22. The second wiring 22 is connected to a conductor pattern in the upper layer through a first through hole conductor 51. The coupling patterns 41 to 43 are each a conductor pattern.

The first wiring 21 is a conductor pattern extending substantially in the direction A. The first wiring 21 is connected at its one end to the through hole conductor 11*a* and overlaps at its other end the first resonance pattern 31. Thus, the through hole conductor 11*a* is provided at a planar position different from the first resonance pattern 31. That is, the opening 11*b* through which the through hole conductor 11*a* penetrates is provided at a position not overlapping the first resonance pattern 31.

The second wiring 22 is a conductor pattern extending substantially in the direction A. The second wiring 22 overlaps at its one end the fourth resonance pattern 34 and is connected at its other end to the first through hole conductor 51. Thus, the first through hole conductor 51 is provided at a planar position different from the fourth resonance pattern 34.

The first to fourth resonance patterns 31 to 34 each constitute a resonator. The first to fourth resonance patterns 31 to 34 are each a both-end open type resonator whose both ends are opened. The length of each of the second and third resonance patterns 32 and 33 is set to about ½ of the passband frequency of the first ½ wavelength filer F1. In each of the first and fourth resonance patterns 31 and 34, the patten width thereof in the direction A is smaller at the center portion between both end portions thereof in the direction B than that at the both end portions. In the present embodiment, the center portion of the first resonance pattern 31 is offset to the fourth resonance pattern 34 side in the direction A with respect to the both end portions, and the edges of the first resonance pattern 31 on the side close to the fourth resonance pattern 34 in the direction A at the both end portions and the center portion are flush with each other. Similarly, the center portion of the fourth resonance pattern 34 is offset to the first resonance pattern 31 side in the direction A with respect to the both end portions, and the edges of the fourth resonance pattern 34 on the side close to the first resonance pattern 31 in the direction A at the both end portions and the center portion are flush with each other.

The second ½ wavelength filter F2 has a symmetric structure to the first ½ wavelength filer F1 with respect to the ground pattern 30. The second ½ wavelength filer F2 includes fifth to eighth resonance patterns 35 to 38 which are conductor patterns. The fifth to eighth resonance patterns 35 to 38 are examples of fifth to eighth conductor patterns, respectively. As illustrated in FIG. 4, the sixth and seventh resonance patterns 36 and 37 are arranged in a line so as to extend in the direction A along the ground pattern 30, i.e., the diagonal line. The sixth resonance pattern 36 is disposed so as to face the second resonance pattern 32 in the direction B, and the seventh resonance pattern 37 is disposed so as to face the third resonance pattern 33 in the direction B. The fifth and eighth resonance patterns 35 and 38 extend in the B direction, respectively with respect to the sixth and seventh resonance patterns 36 and 37.

The fifth resonance pattern 35 overlaps a part of a fourth wiring 24. The fourth wiring 24 is connected to the second signal pad 12 through the through hole conductor 12*a*. Accordingly, the fifth resonance pattern 35 is connected to the second signal pad 12 through capacitive coupling to fourth wiring 24. The fifth and sixth resonance patterns 35 and 36 are capacitively coupled to each other through a coupling pattern 44. The sixth and seventh resonance patterns 36 and 37 are capacitively coupled to each other through a coupling pattern 45. The seventh and eighth resonance patterns 37 and 38 are capacitively coupled to each other through a coupling pattern 46. The eighth resonance pattern 38 overlaps a part of a fifth wiring 25. The fifth wiring 25 is connected to a conductor pattern in the upper layer through a second through hole conductor 52. The coupling patterns 44 to 46 are each a conductor pattern.

The fourth wiring 24 is a conductor pattern extending substantially in the direction A. The fourth wiring 24 is connected at its one end to the through hole conductor 12*a* and overlaps at its other end the fifth resonance pattern 35. Thus, the through hole conductor 12*a* is provided at a planar position different from the fifth resonance pattern 35. That is, the opening 12*b* through which the through hole conductor 12*a* penetrates is provided at a position not overlapping the fifth resonance pattern 35 in a plan view.

The fifth wiring 25 is a conductor pattern extending substantially in the direction A. The fifth wiring 25 overlaps at its one end the eighth resonance pattern 38 and is connected at its other end to the second through hole conductor 52. Thus, the second through hole conductor 52 is provided at a planar position different from the eighth resonance pattern 38.

The fifth to eighth resonance patterns 35 to 38 each constitute a resonator. The fifth to eighth resonance patterns 35 to 38 are each a both-end open type resonator whose both ends are opened. The length of each of the sixth and seventh resonance patterns 36 and 37 is set to about ½ of the passband frequency of the second ½ wavelength filer F2. In each of the fifth and eighth resonance patterns 35 and 38, the patten width thereof in the direction A is smaller at the center portion between both end portions thereof in the direction B than that at the both end portions. In the present embodiment, the center portion of the fifth resonance pattern 35 is offset to the eighth resonance pattern 38 side in the direction A with respect to the both end portions, and the edges of the fifth resonance pattern 35 on the side close to the eighth resonance pattern 38 in the direction A at the both end portions and the center portion are flush with each other. Similarly, the center portion of the eighth resonance pattern 38 is offset to the fifth resonance pattern 35 side in the direction A with respect to the both end portions, and the edges of the eighth resonance pattern 38 on the side close to the fifth resonance pattern 35 in the direction A at the both end portions and the center portion are flush with each other.

The overlap area between the fourth resonance pattern 34 and the second wiring 22 and the overlap area between the eighth resonance pattern 38 and the fifth wiring 25 are larger than the overlap area between the first resonance pattern 31 and the first wiring 21 and the overlap area between the fifth resonance pattern 35 and the fourth wiring 24. This facilitates impedance matching to make it possible to widen a band in which a satisfactory return loss can be obtained.

Figure 5:
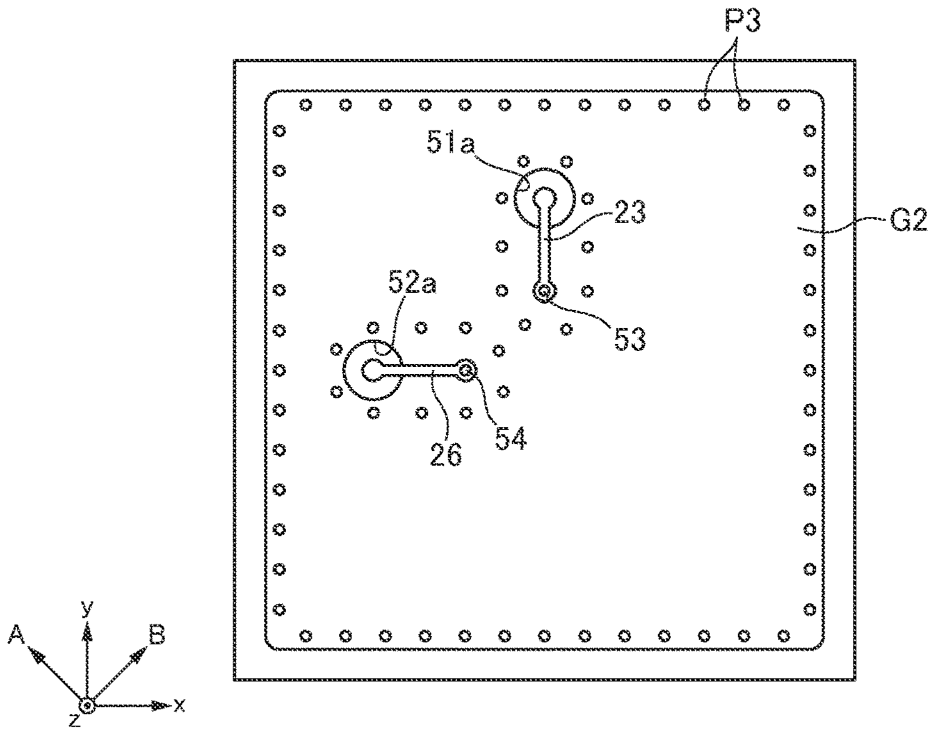

The conductor pattern illustrated in FIG. 5 is a conductor pattern positioned in the upper layer of the conductor pattern illustrated in FIG. 4 and has a ground pattern G2 formed on substantially the entire surface of the xy plane. The ground pattern G2 is connected to the ground patterns G1 and 30 through their through hole conductors P1 and P2 illustrated in FIGS. 3 and 4. As illustrated in FIG. 5, the ground pattern G2 has first and second openings 51*a* and 52*a*, and the first and second through hole conductors 51 and 52 pass through the first and second openings 51*a* and 52*a*, respectively, to be connected respectively to one ends of the third and sixth wirings 23 and 26 positioned in the upper layer of the ground pattern G2. Since the first through hole conductor 51 is connected to the other end of the second wiring 22, the first opening 51*a* through which the first through hole conductor 51 penetrates is provided at a position not overlapping the fourth resonance pattern 34 in a plan view. Further, since the second through hole conductor 52 is connected to the other end of the fifth wiring 25, the second opening 52*a* through which the second through hole conductor 52 penetrates is provided at a position not overlapping the eighth resonance pattern 38 in a plan view. The pattern width of each of the third and sixth wirings 23 and 26 is designed to be smaller than the pattern width of each of the second and fifth wirings 22 and 25. This facilitates impedance matching to make it possible to widen a band in which a satisfactory return loss can be obtained. The ground pattern G2 is further connected to a ground pattern in the upper layer through a plurality of through hole conductors P3.

The third wiring 23 is a conductor pattern extending in the y-direction. The third wiring 23 is connected at its one end to the first through hole conductor 51 and connected at its the other end to the through hole conductor 53. Thus, the first through hole conductor 51 and the through hole conductor 53 are provided at mutually different positions.

The sixth wiring 26 is a conductor pattern extending in the x-direction. The sixth wiring 26 is connected at its one end to the second through hole conductor 52 and connected at its other end to the through hole conductor 54. Thus, the second through hole conductor 52 and the through hole conductor 54 are provided at mutually different positions.

Figure 6:
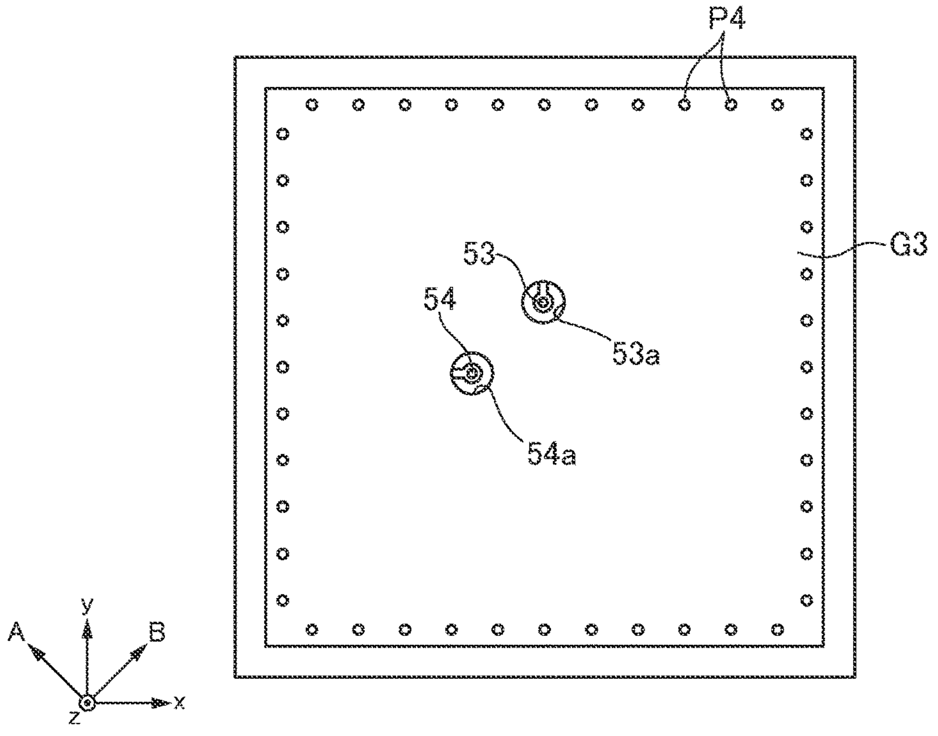

The conductor pattern illustrated in FIG. 6 is a conductor pattern positioned in the upper layer of the conductor pattern illustrated in FIG. 5 and has a ground pattern G3 formed on substantially the entire surface of the xy plane. The ground pattern G3 is connected to the ground patterns G2 through the through hole conductor P3 illustrated in FIG. 5. As illustrated in FIG. 6, the ground pattern G3 has openings 53*a* and 54*a* through which the through hole conductors 53 and 54 connected respectively to the other ends of the third and sixth wires 23 and 26 pass. Since the through hole conductor 53 is connected to the other end of the third wiring 23, the opening 53*a* through which the through hole conductor 53 penetrates is provided at a position not overlapping the first opening 51*a* in a plan view. Further, since the through hole conductor 54 is connected to the other end of the sixth wiring 26, the opening 54*a* through which the through hole conductor 54 penetrates is provided at a position not overlapping the second opening 52*a* in a plan view. The ground pattern G3 is further connected to a ground pattern in the upper layer through a plurality of through hole conductors P4.

Figure 7:
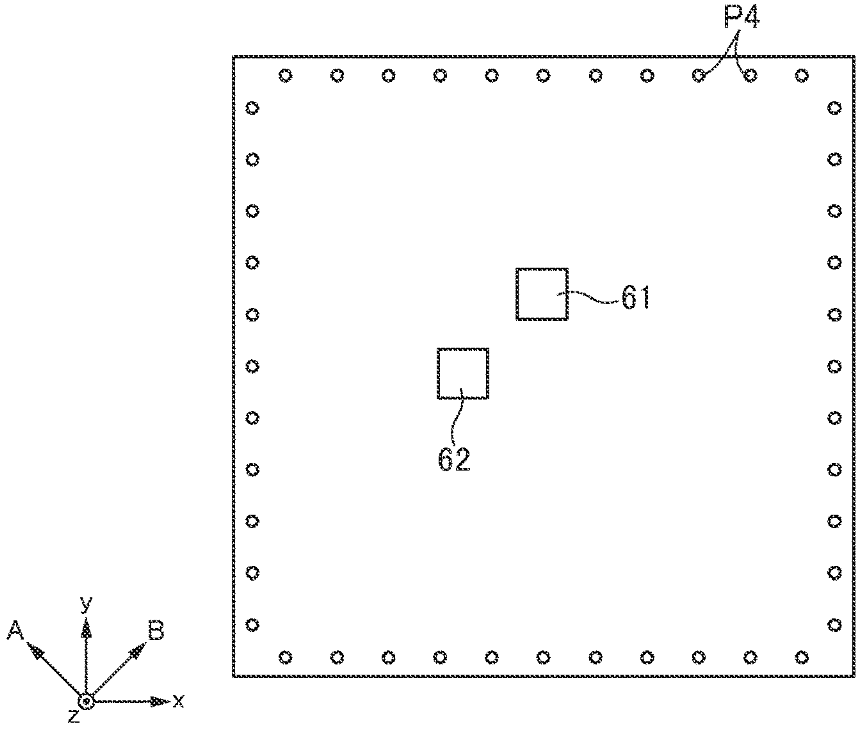

The conductor pattern illustrated in FIG. 7 is a conductor pattern positioned in the upper layer of the conductor pattern illustrated in FIG. 6 and has first and second capacitive coupling electrodes 61 and 62. The first and second capacitive coupling electrodes 61 and 62 are connected respectively to the through hole conductors 53 and 54.

Figure 8:
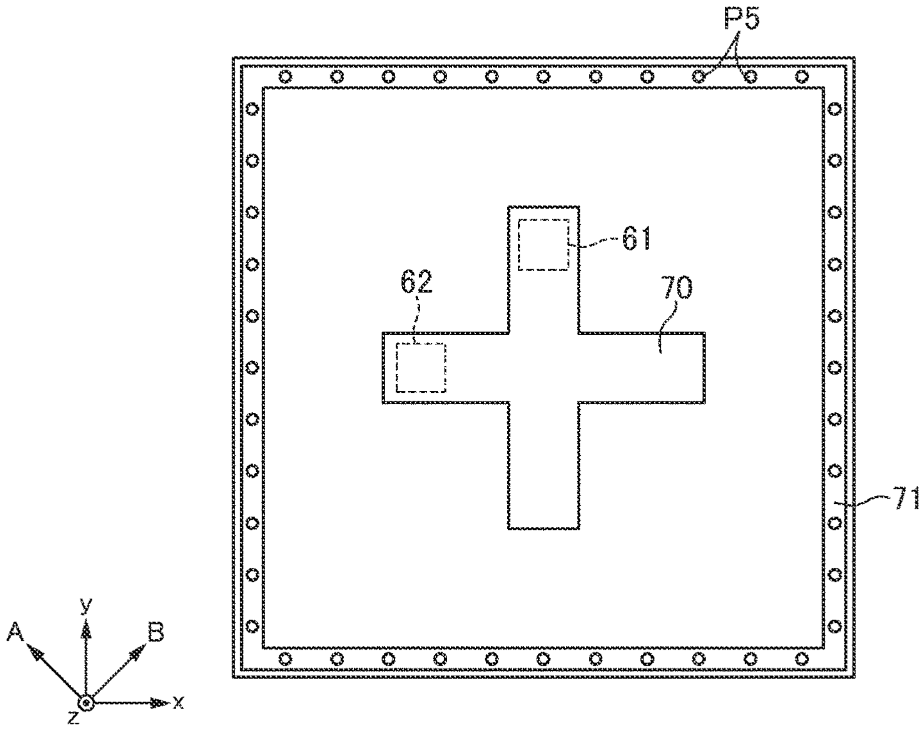

The conductor pattern illustrated in FIG. 8 is a conductor pattern positioned in the upper layer of the conductor pattern illustrated in FIG. 7 and has a feed electrode 70 and a ground pattern 71. The feed electrode 70 has a cross shape, in which one end portion in the y-direction overlaps the first capacitive coupling electrode 61, and one end portion in the x-direction overlaps the second capacitive coupling electrode 62. As a result, the feed electrode 70 is capacitively coupled to the first and second capacitive coupling electrodes 61 and 62. The ground pattern 71 has a rectangular annular shape disposed along the outer periphery and is connected to the ground pattern G3 through the through hole conductors P4 illustrated in FIGS. 6 and 7. The ground pattern 71 is further connected to a ground pattern in the upper layer through a plurality of through hole conductors P5.

Figure 9:
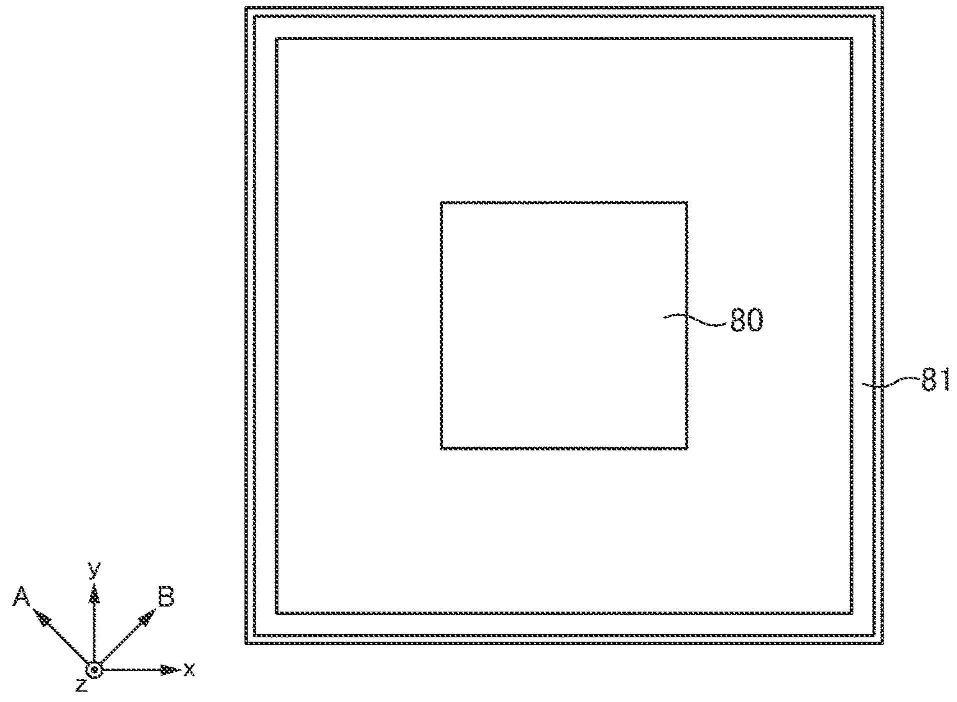

The conductor pattern illustrated in FIG. 9 is a conductor pattern positioned in the upper layer of the conductor pattern illustrated in FIG. 8 and has an antenna element 80 and a ground pattern 81. The antenna element 80 is a patch conductor having a substantially rectangular shape and overlaps the feed electrode 70. As a result, the antenna element 80 and feed electrode 70 are capacitively coupled. The ground pattern 81 has a rectangular annular shape disposed along the outer periphery and is connected to the ground pattern 71 through the through hole conductors P5 illustrated in FIG. 8.

With the above configuration, the first ½ wavelength filer F1 is inserted between the first signal pad 11 and the antenna element 80, and the second ½ wavelength filer F2 is inserted between the second signal pad 12 and the antenna element 80. The first signal pad 11 is coupled to the antenna element 80 through the through hole conductor 11*a*, first wiring 21, first to fourth resonance patterns 31 to 34, second wiring 22, first through hole conductor 51, third wiring 23, through hole conductor 53, first capacitive coupling electrode 61, and feed electrode 70 in this order. Similarly, the second signal pad 12 is coupled to the antenna element 80 through the through hole conductor 12*a*, fourth wiring 24, fifth to eighth resonance patterns 35 to 38, fifth wiring 25, second through hole conductor 52, sixth wiring 26, through hole conductor 54, second capacitive coupling electrode 62, and feed electrode 70 in this order. However, it is not essential that the first and second capacitive coupling electrodes 61 and 62 are coupled to the antenna element 80 through the feed electrode 70. That is, with the feed electrode 70 omitted, power may be directly fed from the first and second capacitive coupling electrodes 61 and 62 to the antenna element 80.

Thus, a vertically polarized signal supplied to the first signal pad 11 and a horizontally polarized signal supplied to the second signal pad 12 are fed to the antenna element 80, respectively through the first and second ½ wavelength filters F1 and F2, thereby achieving dual polarization. Further, the first and second ½ wavelength filters F1 and F2 are symmetrically disposed, and the ground pattern 30 is provided therebetween, so that filter characteristics for the vertically polarized signal and those for the horizontally polarized signal substantially coincide with each other, and isolation therebetween is enhanced. Further, the second, third, sixth, and seventh resonance patterns 32, 33, 36, and 37 each large in size in the longitudinal direction are disposed so as to extend in the direction A along the diagonal line of the antenna element 80, so that even when the first and second ½ wavelength filters F1 and F2 have a large size, they can be set within a limited planar size. In addition, since the second and third resonance patterns 32 and 33 are linearly disposed, and the sixth and seventh resonance patterns 36 and 37 are linearly disposed, filter characteristics are enhanced as compared to when they are disposed in a folded state.

Further, the fourth and eighth resonance patterns 34 and 38 are not directly connected respectively to the first and second capacitive coupling electrodes 61 and 62. Specifically, the fourth resonance pattern 34 is connected to the first capacitive coupling electrode 61 through the second wiring 22, first through hole conductor 51, third wiring 23, and through hole conductor 53, and the eighth resonance pattern 38 is connected to the second capacitive coupling electrode 62 through the fifth wiring 25, second through hole conductor 52, sixth wiring 26, and through hole conductor 54. This facilitates the design of the first and second ½ wavelength filters F1 and F2. In addition, the first opening 51*a* through which the first through hole conductor 51 passes is provided at a position not overlapping the fourth resonance pattern 34 and first capacitive coupling electrode 61 in a plan view, and the second opening 52*a* through which the second through hole conductor 52 passes is provided at a position not overlapping the eighth resonance pattern 38 and second capacitive coupling electrode 62 in a plan view, unnecessary coupling does not occur in the fourth and eighth resonance patterns 34 and 38 and the first and second capacitive coupling electrodes 61 and 62. This can suppress unnecessary coupling between the antenna and the filter in the antenna module 1.

Further, the first, fourth, fifth, and eighth resonance patterns 31, 34, 35, and 38 each have a constructed shape in which the patten width thereof in the direction A is smaller at the center portion between both end portions thereof in the direction B than that at the both end portions. The center portion of the resonance pattern is a part at which the current distribution of a standing wave is dense, and selectively reducing the pattern width at this part allows a reduction in resonance frequency without changing the lengths of the first, fourth, fifth, and eighth resonance patterns 31, 34, 35, and 38 in the direction B. Further, the first and fourth wirings 21 and 24 are coupled respectively to one of the both end portions of the first resonance pattern 31 and one of the both end portions of the fifth resonance pattern 35, and the second and fifth wirings 22 and 25 are coupled respectively to one of the both end portions of the fourth resonance pattern 34 and one of the both end portions of the eighth resonance pattern 38. The both end portions of the resonance pattern are each a part at which current distribution is coarse, while electric field distribution is dense, so that the capacitive coupling at this part can achieve more stable electric field coupling.

Figure 10:
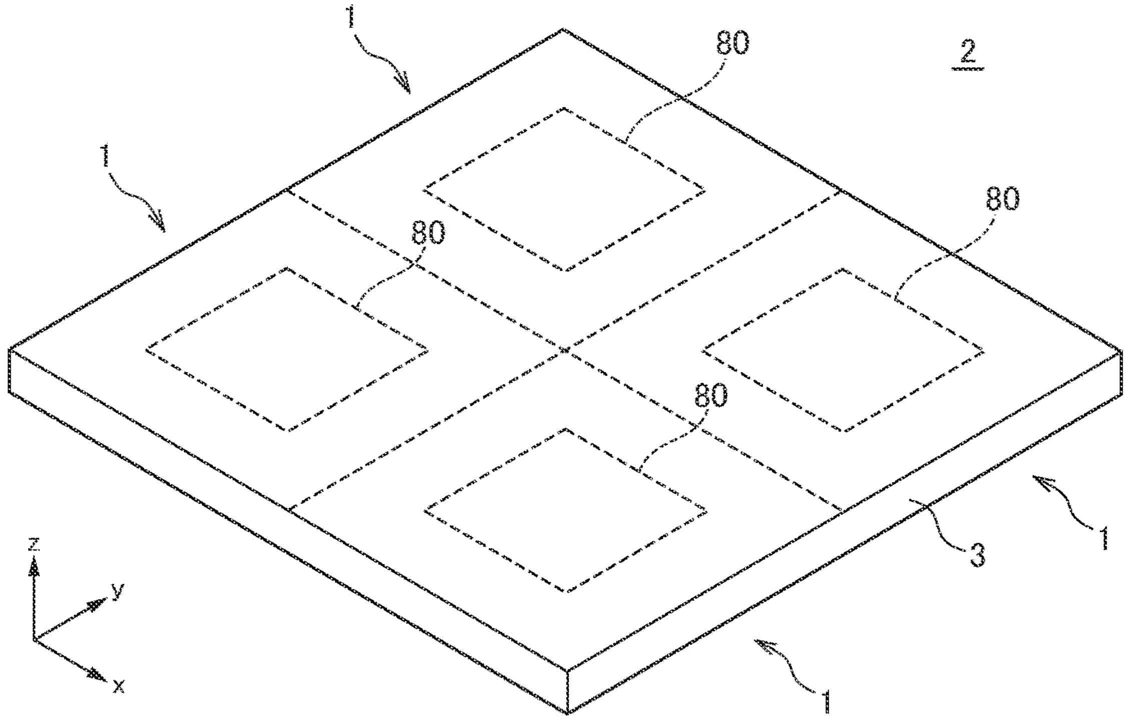
FIG. 10 is a schematic perspective view illustrating the outer appearance of an antenna module 2 according to a second embodiment of the present disclosure.

FIG. 10 is a schematic perspective view illustrating the outer appearance of an antenna module 2 according to a second embodiment of the present disclosure.

As illustrated in FIG. 10, the antenna module 2 according to the second embodiment has a structure in which four elements each having substantially the same structure as the conductor patterns included in the antenna module 1 are laid out in an array in the x- and y-directions. The four elements included in the antenna module 2 need not have completely the same structure as those of the antenna module 1 and may be partly different therefrom. By thus laying out a plurality of elements having substantially the same structure as the antenna module 1, it is possible to control a beam radiation direction under phase control.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

An antenna module according to the present disclosure includes first and second signal pads, an antenna element, a first filter inserted between the first signal pad and the antenna element, and a second filter inserted between the second signal pad and the antenna element. The first filter includes first to fourth conductor patterns. The second filter includes fifth to eighth conductor patterns. The first signal pad is coupled to the antenna element through the first to fourth conductor patterns in this order. The second signal pad is coupled to the antenna element through the fifth to eighth conductor patterns in this order. The second and third conductor patterns are arranged in a line so as to extend in a first direction along the diagonal line of the antenna element. The sixth and seventh conductor patterns are arranged in a line so as to extend in the first direction along the diagonal line of the antenna element. The second and sixth conductor patterns face each other in a second direction perpendicular to the first direction with the diagonal line interposed therebetween. The third and seventh conductor patterns face each other in the second direction with the diagonal line interposed therebetween. The first and fourth conductor patterns extend in the second direction, respectively with respect to the second and third conductor patterns. The fifth and eighth conductor patterns extend in the second direction, respectively with respect to the sixth and seventh conductor patterns. With this configuration, a dual polarization type antenna module can be downsized.

The antenna module according to the present disclosure may further include a first wiring connected to the first signal pad and coupled to the first conductor pattern, a second wiring coupled to the fourth conductor pattern, a third wiring connected to the second wiring through a first through hole conductor and feeds power to the antenna element, a fourth wiring connected to the second signal pad and coupled to the fifth conductor pattern, a fifth wiring coupled to the eighth conductor pattern, and a sixth wiring connected to the fifth wiring through a second through hole conductor and feeds power to the antenna element. This facilitates the design of the first and second filters.

The antenna module according to the present disclosure may further include a first ground pattern having first and second openings through which the first and second through hole conductors pass respectively, and a second ground pattern having a third opening through which a third through conductor connected to the third wiring passes and a fourth opening through which a fourth through conductor connected to the sixth wiring passes. The first opening may be provided at a position not overlapping the fourth conductor pattern and third opening in a plan view, and the second opening may be provided at a position not overlapping the eighth conductor pattern and fourth opening in a plan view. This makes unnecessary resonance less likely to occur in the fourth and eight conductor patterns and the first and second capacitive coupling electrodes.

The pattern width of each of the first, fourth, fifth, and eighth conductor patterns in the first direction may be smaller at the center portion between both end portions thereof in the second direction than at the both end portions. This can reduce the resonance frequency without changing the length of each of the first, fourth, fifth, and eighth conductor patterns in the second direction. In this case, the first wiring may be coupled to one of the both end portions of the first conductor pattern, the fourth wiring may be coupled to one of the both end portions of the fifth conductor pattern, the second wiring may be coupled to one of the both end portions of the fourth conductor pattern, and the fifth wiring may be coupled to one of the both end portions of the eighth conductor pattern. This can achieve stable electric field coupling.

The pattern width of each of the third and sixth wirings may be smaller than that of each of the second and fifth wirings. This makes it possible to widen a band in which a satisfactory return loss can be obtained.

The overlap area between the fourth conductor pattern and the second wiring and the overlap area between the eighth conductor pattern and the fifth wiring may be larger than the overlap area between the first conductor pattern and the first wiring and the overlap area between the fifth conductor pattern and the fourth wiring. This makes it possible to widen a band in which a satisfactory return loss can be obtained.

What is claimed is:

1. An antenna module comprising:
first and second signal pads;
an antenna element;
a first filter inserted between the first signal pad and the antenna element; and
a second filter inserted between the second signal pad and the antenna element,
wherein the first filter includes first to fourth conductor patterns,
wherein the second filter includes fifth to eighth conductor patterns,
wherein the first signal pad is coupled to the antenna element through the first to fourth conductor patterns in this order,
wherein the second signal pad is coupled to the antenna element through the fifth to eighth conductor patterns in this order,
wherein the second and third conductor patterns are arranged in a line so as to extend in a first direction along a diagonal line of the antenna element,
wherein the sixth and seventh conductor patterns are arranged in a line so as to extend in the first direction along the diagonal line of the antenna element,
wherein the second and sixth conductor patterns face each other in a second direction perpendicular to the first direction with the diagonal line interposed therebetween,
wherein the third and seventh conductor patterns face each other in the second direction with the diagonal line interposed therebetween,
wherein the first and fourth conductor patterns extend in the second direction, respectively with respect to the second and third conductor patterns, and
wherein the fifth and eighth conductor patterns extend in the second direction, respectively with respect to the sixth and seventh conductor patterns.

2. The antenna module as claimed in claim 1, further comprising:
a first wiring connected to the first signal pad and coupled to the first conductor pattern;
a second wiring coupled to the fourth conductor pattern;
a third wiring connected to the second wiring through a first through hole conductor and feeds power to the antenna element;
a fourth wiring connected to the second signal pad and coupled to the fifth conductor pattern;
a fifth wiring coupled to the eighth conductor pattern; and
a sixth wiring connected to the fifth wiring through a second through hole conductor and feeds power to the antenna element.

3. The antenna module as claimed in claim 2, further comprising:
a first ground pattern having first and second openings through which the first and second through hole conductors pass respectively; and
a second ground pattern having a third opening through which a third through conductor connected to the third wiring passes and a fourth opening through which a fourth through conductor connected to the sixth wiring passes,
wherein the first opening is provided at a position not overlapping the fourth conductor pattern and third opening in a plan view, and
wherein the second opening is provided at a position not overlapping the eighth conductor pattern and fourth opening in a plan view.

4. The antenna module as claimed in claim 2,
wherein each of the first, fourth, fifth, and eighth conductor patterns has i) a first end portion, ii) a second end portion opposite the first end portion, and iii) a center portion extending between the first end and the second end in the second direction,
wherein the first end portion has a first width extending in the first direction, the second end portion has a second width extending in the first direction, and the central portion has a third width extending in the first direction, and
wherein the third width of the central portion is smaller than the first width of the first end portion and the second width of the second end portion.

5. The antenna module as claimed in claim 4,
wherein the first wiring is coupled to one of the first and second end portions of the first conductor pattern, and
wherein the fourth wiring is coupled to one of the first and second end portions of the fifth conductor pattern.

6. The antenna module as claimed in claim 4,
wherein the second wiring is coupled to one of the first and second end portions of the fourth conductor pattern, and
wherein the fifth wiring is coupled to one of the first and second end portions of the eighth conductor pattern.

7. The antenna module as claimed in claim 2, wherein a pattern width of each of the third and sixth wirings is smaller than that of each of the second and fifth wirings.

8. The antenna module as claimed in claim 2, wherein an overlap area between the fourth conductor pattern and the second wiring and an overlap area between the eighth conductor pattern and the fifth wiring are larger than an overlap area between the first conductor pattern and the first wiring and an overlap area between the fifth conductor pattern and the fourth wiring.

* * * * *